United States Patent
Luan et al.

(10) Patent No.: US 12,350,887 B2
(45) Date of Patent: Jul. 8, 2025

(54) ADAPTIVE THERMAL DIFFUSIVITY

(71) Applicant: Peridot Print LLC, Palo Alto, CA (US)

(72) Inventors: He Luan, Palo Alto, CA (US); Jun Zeng, Palo Alto, CA (US)

(73) Assignee: PERIDOT PRINT LLC, Palo Alto, CA (US)

( * ) Notice: Subject to any disclaimer, the term of this patent is extended or adjusted under 35 U.S.C. 154(b) by 165 days.

(21) Appl. No.: 17/298,496

(22) PCT Filed: Apr. 10, 2019

(86) PCT No.: PCT/US2019/026756
§ 371 (c)(1),
(2) Date: May 28, 2021

(87) PCT Pub. No.: WO2020/209851
PCT Pub. Date: Oct. 15, 2020

(65) Prior Publication Data
US 2022/0016846 A1     Jan. 20, 2022

(51) Int. Cl.
*B29C 64/393*     (2017.01)
*B29C 64/295*     (2017.01)
(Continued)

(52) U.S. Cl.
CPC .......... *B29C 64/393* (2017.08); *B29C 64/295* (2017.08); *G06N 3/08* (2013.01);
(Continued)

(58) Field of Classification Search
CPC ........ G06N 3/0895; G06N 3/09; G06N 3/091; G06N 3/092; G06N 3/094; G06N 3/096; G06N 3/098; G06N 3/0985; G06N 3/08; G06N 20/00; B29C 64/393; B29C 64/295; B33Y 10/00; B33Y 50/02
See application file for complete search history.

(56) References Cited

U.S. PATENT DOCUMENTS

| 6,839,608 B2 | 1/2005 | Sarabi et al. |
| 8,504,958 B2 * | 8/2013 | Kariat ............ G06F 30/367 716/110 |

(Continued)

FOREIGN PATENT DOCUMENTS

| WO | WO-2006076601 A1 | 7/2006 |
| WO | WO-2008008238 A2 | 1/2008 |
| WO | WO-2017194124 A1 * | 11/2017 ............. B29C 41/46 |

OTHER PUBLICATIONS

Chudzik, Measurement of thermal diffusivity of insulating material using an artificial neural network (Year: 2012).*

*Primary Examiner* — Abdullah Al Kawsar
*Assistant Examiner* — Tewodros E Mengistu
(74) *Attorney, Agent, or Firm* — Shook, Hardy & Bacon L.L.P.

(57) ABSTRACT

Examples of methods for determining an adaptive thermal diffusivity kernel are described herein. In some examples, an adaptive thermal diffusivity kernel is determined based on a map. In some examples, a temperature is predicted based on the adaptive thermal diffusivity kernel. In some examples, the map includes a temperature map, a shape map, or a concatenation of the temperature map and the shape map.

20 Claims, 5 Drawing Sheets

(51) Int. Cl.
 *B33Y 10/00* (2015.01)
 *B33Y 50/02* (2015.01)
 *G06N 3/08* (2023.01)
 *G06N 20/00* (2019.01)

(52) U.S. Cl.
 CPC .............. *G06N 20/00* (2019.01); *B33Y 10/00* (2014.12); *B33Y 50/02* (2014.12)

(56) References Cited

U.S. PATENT DOCUMENTS

| | | |
|---|---|---|
| 9,919,360 B2 | 3/2018 | Buller et al. |
| 2003/0043251 A1 | 3/2003 | Saquib et al. |
| 2003/0048317 A1* | 3/2003 | Usui ..................... B41J 29/393 347/14 |
| 2003/0125206 A1 | 7/2003 | Bhatt et al. |
| 2016/0185048 A1 | 6/2016 | Dave et al. |
| 2016/0358070 A1* | 12/2016 | Brothers ................ G06N 3/082 |
| 2017/0087767 A1 | 3/2017 | Grewell |
| 2017/0278672 A1* | 9/2017 | Suganuma .......... H01J 37/3026 |
| 2017/0368741 A1* | 12/2017 | Mandel ................ B29C 64/112 |
| 2017/0368754 A1 | 12/2017 | Fruth et al. |
| 2018/0093419 A1 | 4/2018 | Lappas et al. |
| 2019/0001658 A1 | 1/2019 | Mathews et al. |
| 2019/0056717 A1 | 2/2019 | Kothari et al. |
| 2019/0129636 A1* | 5/2019 | Benisty ................ G06F 3/0634 |
| 2019/0188346 A1* | 6/2019 | Mirabella ............... B22F 10/80 |
| 2019/0337232 A1* | 11/2019 | Prabha Narra ......... G06F 30/23 |
| 2019/0384871 A1* | 12/2019 | Matei ..................... G06N 20/00 |
| 2020/0004225 A1* | 1/2020 | Buller ...................... B22F 5/04 |
| 2020/0012940 A1* | 1/2020 | Liu ...................... H04N 7/0135 |
| 2021/0117581 A1* | 4/2021 | Laaker .................. B29C 64/124 |
| 2022/0171902 A1* | 6/2022 | Chen ...................... B22F 10/85 |

\* cited by examiner

ADAPTIVE THERMAL DIFFUSIVITY

BACKGROUND

Three-dimensional (3D) solid parts may be produced from a digital model using additive manufacturing. Additive manufacturing may be used in rapid prototyping, mold generation, mold master generation, and short-run manufacturing. Additive manufacturing involves the application of successive layers of build material. This is unlike traditional machining processes that often remove material to create the final part. In some additive manufacturing techniques, the build material may be cured or fused.

DETAILED DESCRIPTION

Additive manufacturing may be used to manufacture 3D objects. Three-dimensional (3D) printing is an example of additive manufacturing. Some examples of 3D printing may selectively deposit agents (e.g., droplets) at a pixel level to enable control over voxel-level energy deposition. For instance, thermal energy may be projected over material in a build area, where a phase change and solidification in the material may occur depending on the voxels where the agents are deposited.

Achieving voxel-level thermal control may be aided by understanding of and quantitative prediction of how thermal diffusion and phase change influence each other. However, voxel-level thermal diffusion among printed layers may be difficult to learn due to complicated thermal diffusivity properties. For example, dealing with heterogeneous material may complicate the properties of thermal diffusivity. Thermal diffusivity is the ability of a material to transfer (e.g., absorb or disperse) heat. For example, thermal diffusivity of a voxel of material is the ability of the voxel to absorb heat from or disperse heat to a neighboring voxel or voxels. In some examples, thermal diffusivity may be a function of the properties of a voxel and also a function of the properties of neighboring voxels. Properties of thermal diffusivity may depend on phase and temperature. For example, thermal diffusivity may vary based on the current phase of a material (e.g., solid, liquid, powder, solidified part, or phase in between, etc.) and current temperature of the material. Another complicating factor for learning thermal diffusivity is that thermal diffusivity may be anisotropic. For example, the impact of different neighboring voxels may not be the same.

For a given layer, thermal diffusion (from all pixels) may be one energy driver for a pixel. Other energy drivers may include energy absorption (for a part voxel) and convective air loss (for all voxels). Thermal diffusion is one energy driver for buried layers. Thermal diffusion (e.g., heat flux) may occur while there is temperature gradient for neighboring voxels within a part, part/powder boundary, and/or within powder.

Due to the phase-dependent heterogeneous and antistrophic properties of thermal diffusivity, approaches that use a constant thermal diffusivity may lead to errors in thermal prediction and phase change estimation. For example, in some first-principle based approaches, thermal diffusivity may be treated as a scalar or a simple function of temperature, which may not accurately represent reality. This issue may be more severe in metal printing since the diffusivity discrepancy between different phases (e.g., powder, solid part, or phase in between, etc.) can be significantly larger (e.g., an order of magnitude larger) than in polymer printing.

Some examples of the techniques described herein may leverage machine learning (e.g., deep learning) to address the aforementioned difficulties. For example, a machine learning model (e.g., quantitative model) may be trained and discovered via deep learning to generate an adaptive thermal diffusivity kernel. An adaptive thermal diffusivity kernel is an output of a machine learning model (e.g., neural network) of thermal diffusivity for a voxel or voxels of a material or materials. The adaptive thermal diffusivity kernel is adaptive in the sense that the thermal diffusivity kernel adapts to material phase at a voxel position (e.g., material phase of a voxel and/or a neighboring voxel or voxels). For example, the adaptive thermal diffusivity kernel is adaptive to neighboring voxel properties or the adaptive thermal diffusivity kernel may adapt to address the phase of a voxel and its neighboring voxels. The machine learning model, once learned, may be applied online in near-real-time to determine thermal diffusivity at a local position (e.g., pixel, voxel) according to the actual local environment.

An adaptive thermal diffusivity kernel may be utilized to improve thermal modeling to more closely represent physical complexity. The adaptive thermal diffusivity kernel may be utilized to perform various operations. For example, the adaptive thermal diffusivity kernel may be utilized to perform thermal simulation, which may be embedded with print firmware in some implementations. In another example, the adaptive thermal diffusivity kernel may be utilized in online monitoring to detect phase changes (e.g., near-real-time phase changes) at the voxel level. The voxel level phase change may be utilized to extrapolate end-part quality (e.g., geometrical accuracy).

Some examples of the techniques disclosed herein include a physical model constrained machine learning model (e.g., data-driven quantitative model) that may learn voxel thermal diffusivity as a function of neighboring voxel phase and environment. For example, given a temperature map at time t and/or a shape map, the machine learning model may adaptively predict thermal diffusivity in different directions at any local position (e.g., voxel), and may predict a temperature map at time t+dt (where dt is an amount of time after t for prediction).

Some examples of the techniques disclosed herein may utilize a hybrid modeling approach that combines a physical model and a deep learning model to learn a physical property: thermal diffusivity. For instance, a physical model-constrained data-driven approach may be utilized that models the thermal diffusivity of each pixel or voxel as an adaptive thermal diffusivity kernel. Each parameter inside of the thermal diffusivity kernel may be a function of the neighbor environment of the pixel of voxel. In some examples, a neural network architecture may be utilized that predicts temperature (e.g., thermal conduction) with a local phase-adaptive thermal diffusivity kernel.

Thermal behavior may be mapped as a temperature map. A temperature map is a set of data indicating temperature(s) (or thermal energy) in an area or volume. Temperature mapping may include obtaining (e.g., sensing and/or capturing) a temperature map or thermal images and/or calculating (e.g., predicting) a temperature map or thermal images. In some examples, a machine learning model (e.g., neural network or networks) may be used to calculate predicted temperature(s) or a temperature map. A predicted temperature or temperature map is a temperature or temperature map that is calculated using a machine learning model.

A temperature map may be based on a captured thermal image. A captured thermal image is sensed or captured with a sensor or sensors. In some examples, a thermal image may be captured along a dimension (e.g., x, y, or z direction), in two dimensions (2D) (e.g., x and y, x and z, or y and z), or three dimensions (3D) (e.g., x, y, and z). The temperature map may be the thermal image or may be based on the thermal image. For example, a transformation may be applied to the captured thermal image to produce the temperature map.

It should be noted that while plastics (e.g., polymers) may be utilized as a way to illustrate some of the approaches described herein, the techniques described herein may be utilized in various examples of additive manufacturing. Some additive manufacturing techniques may be powder-based and driven by powder fusion. Some examples of the approaches described herein may be applied to area-based powder bed fusion-based additive manufacturing, such as Stereolithography (SLA), Multi-Jet Fusion (MJF), Metal Jet Fusion, Selective Laser Melting (SLM), Selective Laser Sintering (SLS), liquid resin-based printing, etc. Some examples of the approaches described herein may be applied to additive manufacturing where agents carried by droplets are utilized for voxel-level thermal modulation. It should be noted that agents may or may not be utilized in some examples. It should also be noted that while some resolutions are described herein as examples, the techniques described herein may be applied for different resolutions.

As used herein, the term "voxel" and variations thereof may refer to a "thermal voxel." In some examples, the size of a thermal voxel may be defined as a minimum that is thermally meaningful (e.g., larger than 42 microns or 600 dots per inch (dpi)). An example of voxel size is 25.4 millimeters (mm)/150≈170 microns for 150 dots per inch (dpi). A maximum voxel size may be approximately 490 microns or 50 dpi. The term "voxel level" and variations thereof may refer to a resolution, scale, or density corresponding to voxel size.

Throughout the drawings, identical or similar reference numbers may designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

Figure 1:
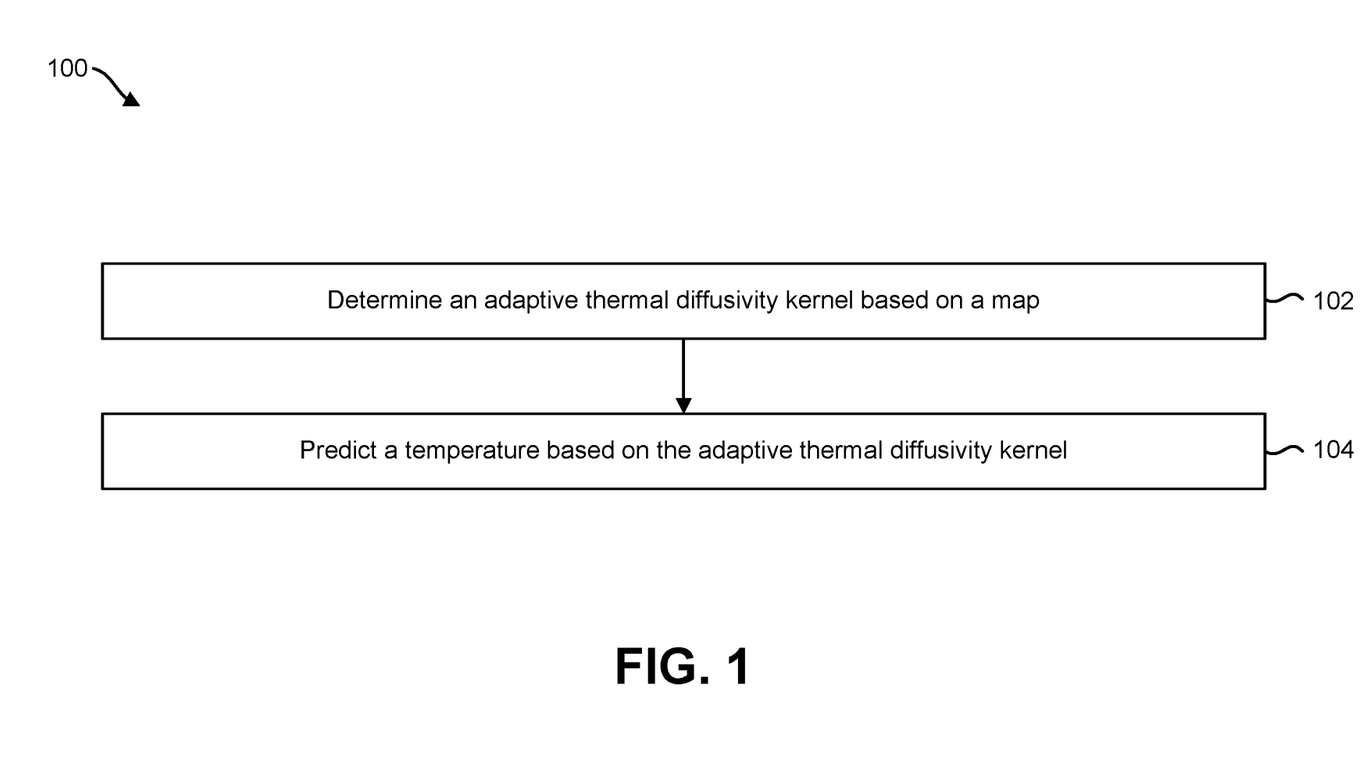
FIG. 1 is a flow diagram illustrating an example of a method for predicting temperature.

FIG. 1 is a flow diagram illustrating an example of a method 100 for predicting temperature. The method 100 and/or an element or elements of the method 100 may be performed by an apparatus (e.g., electronic device). For example, the method 100 may be performed by the 3D printing device described in connection with FIG. 3 and/or the apparatus described in connection with FIG. 4.

The apparatus may determine 102 an adaptive thermal diffusivity kernel based on a map. Examples of the map include a temperature map, a shape map, or a combination thereof. In some examples, the apparatus may determine 102 the adaptive thermal diffusivity kernel based on a temperature map and/or a shape map (e.g., a concatenation of a temperature map and a shape map).

As described above, the adaptive thermal diffusivity kernel is a model of thermal diffusivity for a voxel or voxels of a material or materials. An example of the adaptive thermal diffusivity kernel may be based on a heat transfer model, which may be expressed in accordance with Equation (1).

$$\frac{\partial T(x, y)}{\partial t} = k \Delta T(x, y, t) \qquad (1)$$

In Equation (1), T is temperature, x is one coordinate (e.g., a coordinate in a dimension of a 2D coordinate system or a horizontal dimension), y is another coordinate (e.g., another coordinate corresponding to another dimension of the 2D coordinate system or a vertical dimension), k is thermal diffusivity, $\Delta$ denotes a Laplacian, and t is time. In a case of homogeneous material, k may be treated as a constant.

A discretization of the heat transfer model (e.g., Equation (1)) may be expressed as given in Equation (2).

$$\frac{T(x, y, t + dt) - T(x, y, t)}{dt} = \qquad (2)$$

$$k \frac{1}{h^2} (T(x+h, y, t) + T(x-h, y, t) + T(x, y+h, t) +$$

$$T(x, y-h, t) - 4T(x, y, t)) = k \frac{1}{h^2} \begin{bmatrix} 0 & 1 & 0 \\ 1 & -4 & 1 \\ 0 & 1 & 0 \end{bmatrix}$$

$$\begin{bmatrix} T(x-h, y+h, t) & T(x, y+h, t) & T(x+h, y+h, t) \\ T(x-h, y, t) & T(x, y, t) & T(x+h, y, t) \\ T(x-h, y-h, t) & T(x, y-h, t) & T(x+h, y-h, t) \end{bmatrix}$$

In Equation (2), h is a dimension (e.g., width) of a pixel or voxel. In a case (e.g., real-world case) where k is anisotropic, Equation (2) may be expressed as Equation (3).

$$\frac{T(x, y, t + dt) - T(x, y, t)}{dt} = \frac{1}{h^2} \begin{bmatrix} 0 & k_{01} & 0 \\ k_{10} & -4k_{11} & k_{12} \\ 0 & k_{21} & 0 \end{bmatrix} \qquad (3)$$

$$\begin{bmatrix} T(x-h, y+h, t) & T(x, y+h, t) & T(x+h, y+h, t) \\ T(x-h, y, t) & T(x, y, t) & T(x+h, y, t) \\ T(x-h, y-h, t) & T(x, y-h, t) & T(x+h, y-h, t) \end{bmatrix}$$

If T is used to represent a temperature map, then Equation (3) may be expressed as Equation (4).

$$T(t + dt) = dt \cdot \frac{1}{h^2} \cdot K \circ A * T(t) + T(t) \qquad (4)$$

In Equation (4), $$K = \begin{bmatrix} 0 & k_{01} & 0 \\ k_{10} & k_{11} & k_{12} \\ 0 & k_{21} & 0 \end{bmatrix}, A = \begin{bmatrix} 0 & 1 & 0 \\ 1 & -4 & 1 \\ 0 & 1 & 0 \end{bmatrix},$$

∘ is an element-wise product, and * is a convolution operation. Equation (4) is numerically solvable.

K is an example (e.g., a matrix form) of the adaptive thermal diffusion kernel, A is an example of a parameter matrix, and $k_{01}$, $k_{10}$, $k_{11}$, $k_{12}$, and $k_{21}$ are examples of kernel parameters. For example, koi is a kernel parameter corresponding to a pixel or voxel above the current pixel or voxel, $k_{10}$ is a kernel parameter corresponding to a pixel or voxel to the left of the current pixel or voxel, $k_{11}$ is a kernel parameter corresponding to the current pixel or voxel, $k_{12}$ is a kernel parameter corresponding to a pixel or voxel to the right of the current pixel or voxel, and $k_{21}$ is a kernel parameter corresponding to a pixel or voxel below the current pixel or voxel. Kernel parameters are thermal diffusion values in an adaptive thermal diffusivity kernel. In this example, $k_{01}$, $k_{10}$, $k_{12}$, and $k_{21}$ are neighboring kernel parameters to the kernel parameter $k_{11}$ (e.g., central kernel parameter). Neighboring kernel parameters are kernel parameters that are peripheral to (e.g., next to or at a distance from) a central kernel parameter or central kernel parameters. The neighboring kernel parameters may be parameters that are dependent on neighboring voxels. For example, predicting a temperature may be based on the adaptive thermal diffusivity kernel with neighbor-dependent parameters.

For heterogeneous material, the adaptive thermal diffusion kernel (e.g., K) is phase-dependent and temperature-dependent. For example, at each pixel or voxel, the kernel parameters (e.g., $k_{01}$, $k_{10}$, $k_{11}$, $k_{12}$, and $k_{21}$) in the adaptive thermal diffusivity kernel (e.g., K) may be a function of neighboring phase and temperature. A machine learning model (e.g., deep learning architecture, neural network) may be utilized to predict the function. An example of the machine learning model (e.g., neural network architecture) is described in connection with FIG. 5. The machine learning model may be trained to learn weights.

The adaptive thermal diffusivity kernel may be determined 102 based on a temperature map. For example, the apparatus may obtain (e.g., sense, receive, request and receive) the temperature map from a sensor or sensors. For example, a sensor may capture a thermal image of a print bed to produce the temperature map. The temperature map or a portion (e.g., patch) of the temperature map may be utilized as an input to determine 102 the adaptive thermal diffusivity kernel. For example, the weights may be utilized to determine the adaptive thermal diffusivity kernel based on the temperature map.

In some examples, the input to the machine learning model may be denoted X. In some examples, the input may be the temperature map or a portion of the temperature map at a time (e.g., T(t), where t is a current time or timestamp). In some approaches, the temperature map or portion of a temperature map T(t) (e.g., input sensed temperature) may represent phase and/or temperature. In some examples, the input may be a concatenation of a temperature map and a shape map or portions thereof. For instance, the input X may be a portion of T(t) concatenated with a portion of shape map S of a layer (e.g., a current layer of build material(s)). The shape map is a set (e.g., 2D grid) of values that indicates locations for manufacturing (e.g., printing) an object. For example, a shape map may indicate where an object should be formed in a layer. The shape map S may be utilized as input to add more fine details.

In some examples, the apparatus may utilize the machine learning model to determine 102 the adaptive thermal diffusivity kernel based on the input X. For example, the apparatus may apply the input X to the machine learning model (using the weights, for instance) to determine 102 the adaptive thermal diffusivity kernel. In some examples, determining 102 the adaptive thermal diffusivity kernel includes convolving (e.g., separately convolving) a sub-kernel or sub-kernels with the input to produce the adaptive thermal diffusivity kernel. A sub-kernel is a set (e.g., matrix) of weights. A kernel parameter may be determined based on the convolution of the sub-kernel with the input. The adaptive thermal diffusivity kernel may be determined based on (e.g., may include) the kernel parameter(s). For example, the apparatus may arrange the kernel parameters into the adaptive thermal diffusivity kernel (e.g., into a matrix form of an adaptive thermal diffusivity kernel). For instance, the apparatus may arrange the kernel parameters into a matrix form for Equation (4). While some of the examples described herein illustrate a machine learning model (e.g., deep learning model, neural network, etc.) with one layer, a machine learning model with one layer or multiple layers may be implemented in accordance with the techniques described herein.

In some examples, determining 102 the adaptive thermal diffusivity kernel is based on a machine learning model (e.g., deep learning model, neural network, etc.) with one layer or multiple layers. For example, determining 102 the adaptive thermal diffusivity kernel may include using a neural network to determine the adaptive thermal diffusivity kernel K at pixel (x, y) from an input X. For instance, the apparatus may concatenate an m×m patch (e.g., a pixel with neighboring pixels) of the temperature map T(t) with an m×m patch of the shape map S as input X. The input may be separately convolved with a plurality of m×m sub-kernels. In some examples, a sub-kernel may be denoted Q. In some examples, five different m×m sub-kernels $Q_{01}$, $Q_{10}$, $Q_{11}$, $Q_{12}$, and $Q_{21}$ may be separately convolved with the input. The five resulting values may be the kernel parameters $k_{01}$, $k_{10}$, $k_{11}$, $k_{12}$, and $k_{21}$.

In some examples, determining the adaptive thermal diffusivity kernel is based on an activation function to ensure that a kernel parameter is greater than zero. An example of the activation function is the rectified linear unit function, which may be denoted ReLu( ). For example, the ReLu( ) activation function may be utilized to make sure that the kernel parameter is greater than zero, so that kernel parameter is consistent with physical meaning. In an example, the kernel parameters $k_{01}$, $k_{10}$, $k_{11}$, $k_{12}$, and $k_{21}$ may be determined in accordance with Equation (5).

$$k_{01} = \text{ReLu}(Q_{01} * X)$$

$$k_{10} = \text{ReLu}(Q_{10} * X)$$

$$k_{11} = \text{ReLu}(Q_{11} * X)$$

$$k_{12} = \text{ReLu}(Q_{12} * X)$$

$$k_{21} = \text{ReLu}(Q_{21} * X) \quad (5)$$

In Equation (5), $Q_{01}$, $Q_{10}$, $Q_{11}$, $Q_{12}$, and $Q_{21}$ are m×m sub-kernels. For example, m may be 3, 4, 5, 6, or another value. In some approaches, m may be experimentally tuned.

In this example, the five kernel parameters $k_{01}$, $k_{10}$, $k_{11}$, $k_{12}$, and $k_{21}$ may be re-formulated as the adaptive thermal diffusivity kernel K.

The apparatus may predict 104 a temperature based on the adaptive thermal diffusivity kernel. For example, the apparatus may predict 104 a temperature or temperature map (e.g., set of temperatures over an area or volume) based on the thermal diffusivity kernel. In some examples, the apparatus may predict 104 the temperature or temperature map T(t+dt) in accordance with Equation (4).

In some examples, Equation (4) may be implemented as an adaptive convolution layer without a trainable parameter. For example, predicting 104 (e.g., estimating) the temperature may be performed with a convolutional layer that does not include a trainable parameter. During machine learning model training, the actual temperature map (e.g., real thermal sensing) may be utilized to estimate the sub-kernel parameters.

The machine learning model (e.g., neural network) may be constrained by a physical model. The physical model may be deterministic. The machine learning model may be constrained based on a physical model in that the machine learning model may be structured in accordance with the physical model. For example, the machine learning model may be constrained with the physical heat transfer model. The machine learning model may learn the thermal diffusivity as an adaptive thermal diffusivity kernel K, where each kernel parameter is a function of the current pixel or voxel phase and/or temperature. For example, a neural network may be utilized to learn the function. The parameters in the neural network may be model parameters (e.g., weights) to be estimated during training. The machine learning model may utilize fewer parameters (e.g., may reduce the number of parameters) in comparison with purely data-driven neural networks. In some examples, the machine learning model may include a neural network to predict the adaptive thermal diffusivity kernel (with trainable parameters, for instance) and a numerical convolution layer that is based on the physical heat transfer model and that has no trainable parameters.

In some examples, the machine learning model may be a neural network. For example, the machine learning model may utilize one convolution layer, which builds a linear model. In other examples, a hidden layer or hidden layers may be added to build non-linear models. An additional hidden layer or layers may enable learning higher order thermal diffusivity parameters in the adaptive thermal diffusivity kernel K. For instance, a second-order discretization of the heat transfer model (e.g., Equation (1)) may be utilized, which may enable learning a larger thermal diffusivity kernel K, which may include higher order parameters (e.g., weights). In some examples, the machine learning model may include an additional parameter or parameters besides the weights.

Some examples of the techniques described herein may be performed in 2D, where the adaptive thermal diffusivity kernel may be determined and/or a temperature may be predicted in 2D (e.g., for a 2D layer or layers of material(s)). Some examples may consider the in-layer (e.g., fusing layer) x-y thermal diffusion based on 2D temperature map sensing. Some examples of the techniques described herein may be performed with a temperature map based on thermal sensing in a vertical direction (e.g., the z-direction). For example, embedded thermal sensors that collect z-direction thermal sensing may be utilized to determine an adaptive thermal diffusivity kernel and/or predict a temperature in the z direction.

Figure 2:
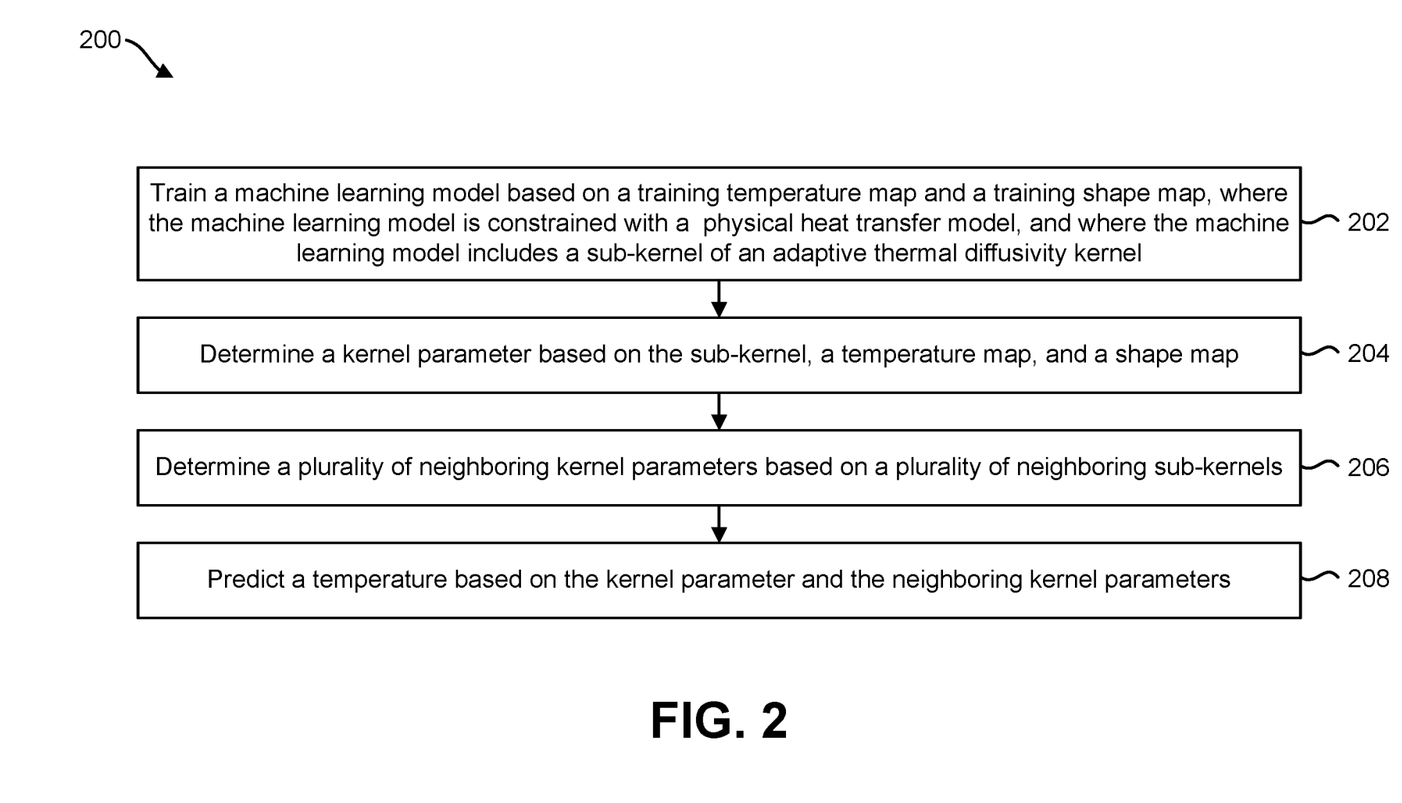
FIG. 2 is a flow diagram illustrating another example of a method for predicting temperature.

FIG. 2 is a flow diagram illustrating another example of a method 200 for predicting temperature. The method 200 and/or an element or elements of the method 200 may be performed by an apparatus (e.g., electronic device). For example, the method 200 may be performed by the 3D printing device described in connection with FIG. 3 and/or the apparatus described in connection with FIG. 4.

The apparatus may train 202 a machine learning model based on a training temperature map and a training shape map. This may be accomplished as described in connection with FIG. 1. For example, the machine learning model may include a sub-kernel or sub-kernels (e.g., Q), which may be trained 202 by the apparatus by providing an input or inputs to the machine learning model, where each input includes a concatenated training temperature map and a training shape map. The machine learning model may be constrained with a physical heat transfer model as described herein. The training 202 may be performed offline (e.g., before runtime or before running online) in some examples.

The apparatus may determine 204 a kernel parameter based on the sub-kernel, a temperature map, and a shape map. This may be accomplished as described in connection with FIG. 1. For example, at runtime (e.g., while running online), the apparatus may obtain a temperature map and a shape map corresponding to a current layer that is being manufactured (e.g., printed). The apparatus may concatenate the temperature map and the shape map to produce an input (e.g., X). The apparatus may convolve the input with the sub-kernel (that corresponds to the current pixel or voxel) to produce a kernel parameter. In some examples, determining 204 the kernel parameter may be performed by determining $k_{11}$ in accordance with Equation (5). For instance, the apparatus may convolve the input X with the sub-kernel $Q_{11}$ and apply an activation function to determine 204 the kernel parameter $k_{11}$.

The apparatus may determine 206 a plurality of neighboring kernel parameters based on a plurality of neighboring sub-kernels. This may be accomplished as described in connection with FIG. 1. For example, the apparatus may convolve the input with the neighboring sub-kernels to produce the neighboring kernel parameters. In some examples, determining 206 the neighboring kernel parameters may be performed by determining $k_{01}$, $k_{10}$, $k_{12}$, and $k_{21}$ in accordance with Equation (5). For instance, the apparatus may convolve the input X with the sub-kernels $Q_{01}$, $Q_{10}$, $Q_{12}$, and $Q_{21}$ and apply activation functions to determine 206 the neighboring kernel parameters $k_{01}$, $k_{10}$, $k_{12}$, and $k_{21}$.

The apparatus may predict 208 a temperature based on the kernel parameter and the neighboring kernel parameters. This may be accomplished as described in connection with FIG. 1. For example, the apparatus may predict 208 a temperature map for a time dt (after the temperature map at time t) in accordance with Equation (4).

Figure 3:
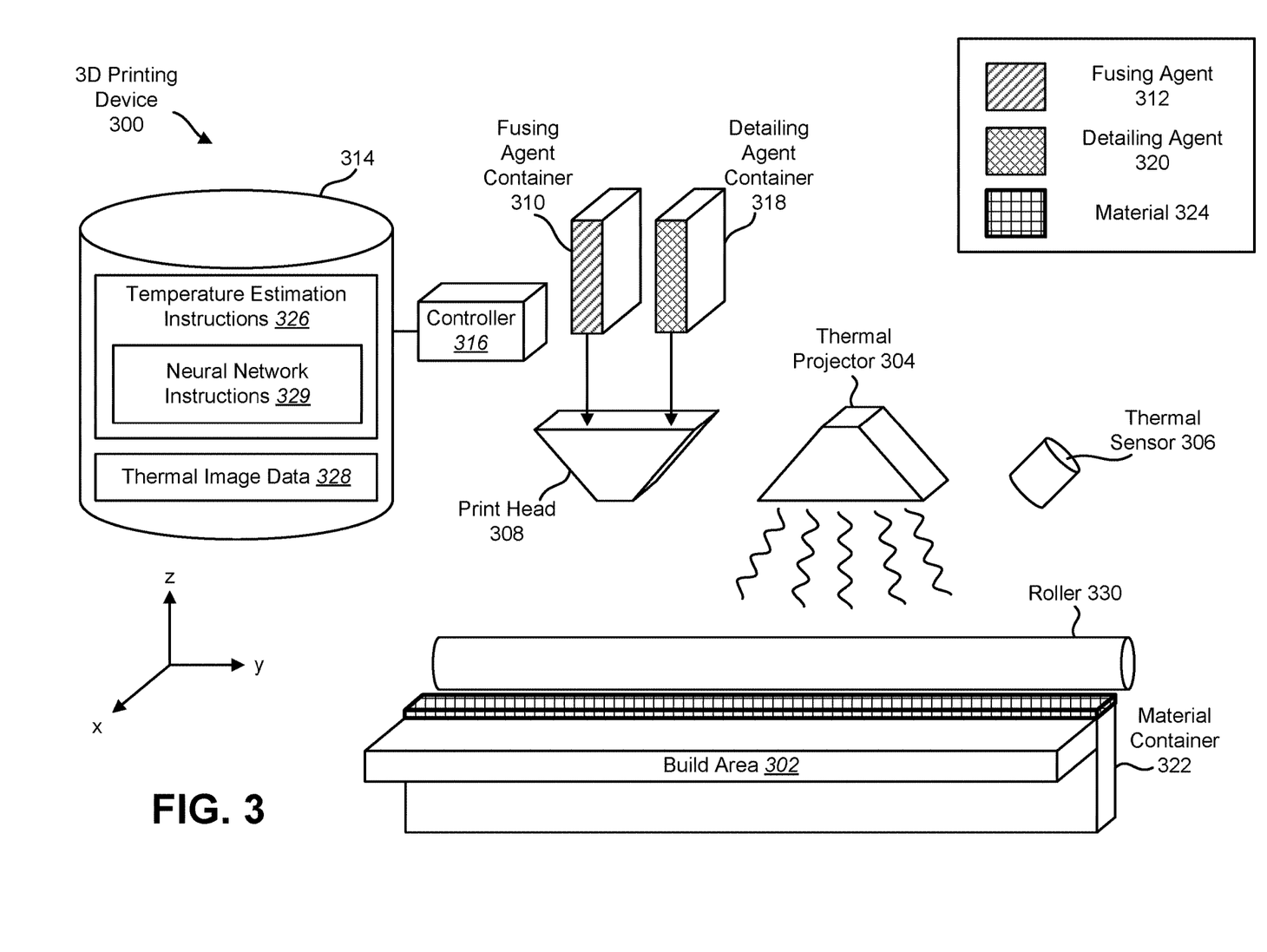
FIG. 3 is a simplified isometric view of an example of a three-dimensional (3D) printing device that may be used in an example of adaptive thermal diffusivity.

FIG. 3 is a simplified isometric view of an example of a 3D printing device 300 that may be used in an example of adaptive thermal diffusivity. The 3D printing device 300 may include a controller 316, a data store 314, a build area 302, a print head 308, a fusing agent container 310, a detailing agent container 318, a roller 330, a material container 322, a thermal projector 304, and/or a thermal sensor 306. The example of a 3D printing device 300 in FIG. 3 may include additional components that are not shown, and some of the components described may be removed and/or modified without departing from the scope of the 3D printing device 300 in this disclosure. The components of the 3D printing device 300 may not be drawn to scale, and thus, may have a size and/or configuration different than what is shown.

In the example of FIG. 3, the 3D printing device 300 includes a fusing agent container 310, fusing agent 312, a detailing agent container 318, detailing agent 320, a material container 322, and material 324. In other examples, the 3D printing device 300 may include more or fewer containers, agents, hoppers, and/or materials. The material container 322 is a container that stores material 324 that may be applied (e.g., spread) onto the build area 302 by the roller 330 for 3D printing. The fusing agent container 310 is a container that stores a fusing agent 312. The fusing agent 312 is a substance (e.g., liquid, powder, etc.) that controls intake thermal intensity. For example, the fusing agent 312 may be selectively applied to cause applied material 324 to change phase with heat applied from the thermal projector 304 and/or to fuse with another layer of material 324. For instance, areas of material 324 where the fusing agent 312 has been applied may eventually solidify into the object being printed. The detailing agent 320 is a substance (e.g., liquid, powder, etc.) that controls outtake thermal intensity. For example, the detailing agent 320 may be selectively applied to detail edges of the object being printed.

The build area 302 is an area (e.g., surface) on which additive manufacturing may be performed. In some configurations, the build area 302 may be the base of a "build volume," which may include a volume above the base. As used herein, the term "build area" may refer to the base of a build volume and/or another portion (e.g., another plane above the base) of the build volume.

The roller 330 is a device for applying material 324 to the build area 302. In order to print a 3D object, the roller 330 may successively apply (e.g., spread) material 324 (e.g., a powder) and the print head 308 may successively apply and/or deliver fusing agent 312 and/or detailing agent 320. The thermal projector 304 is a device that delivers energy (e.g., thermal energy, heat, etc.) to the material 324, fusing agent 312, and/or detailing agent 320 in the build area 302. For example, fusing agent 312 may be applied on a material 324 layer where particles (of the material 324) are meant to fuse together. The detailing agent 320 may be applied to modify fusing and create fine detail and/or smooth surfaces. The areas exposed to energy (e.g., thermal energy from the thermal projector 304) and reactions between the agents (e.g., fusing agent 312 and detailing agent 320) and the material 324 may cause the material 324 to selectively fuse together to form the object.

The print head 308 is a device to apply a substance or substances (e.g., fusing agent 312 and/or detailing agent 320). The print head 308 may be, for instance, a thermal inkjet print head, a piezoelectric print head, etc. The print head 308 may include a nozzle or nozzles (not shown) through which the fusing agent 312 and/or detailing agent 320 are extruded. In some examples, the print head 308 may span a dimension of the build area 302. Although a single print head 308 is depicted, multiple print heads 308 may be used that span a dimension of the build area 302. Additionally, a print head or heads 308 may be positioned in a print bar or bars. The print head 308 may be attached to a carriage (not shown in FIG. 3). The carriage may move the print head 308 over the build area 302 in a dimension or dimensions.

The material 324 is a substance (e.g., powder) for manufacturing objects. The material 324 may be moved (e.g., scooped, lifted, and/or extruded, etc.) from the material container 322, and the roller 330 may apply (e.g., spread) the material 324 onto the build area 302 (on top of a current layer, for instance). In some examples, the roller 330 may span a dimension of the build area 302 (e.g., the same dimension as the print head 308 or a different dimension than the print head 308). Although a roller 330 is depicted, other means may be utilized to apply the material 324 to the build area 302. In some examples, the roller 330 may be attached to a carriage (not shown in FIG. 3). The carriage may move the roller 330 over the build area 302 in a dimension or dimensions. In some implementations, multiple material containers 322 may be utilized. For example, two material containers 322 may be implemented on opposite sides of the build area 302, which may allow material 324 to be spread by the roller 330 in two directions.

In some examples, the thermal projector 304 may span a dimension of the build area 302. Although one thermal projector 304 is depicted, multiple thermal projectors 304 may be used that span a dimension of the build area 302. Additionally, a thermal projector or projectors 304 may be positioned in a print bar or bars. The thermal projector 304 may be attached to a carriage (not shown in FIG. 3). The carriage may move the thermal projector 304 over the build area 302 in a dimension or dimensions.

In some examples, each of the print head 308, roller 330, and thermal projector 304 may be housed separately and/or may move independently. In some examples, two or more of the print head 308, roller 330, and thermal projector 304 may be housed together and/or may move together. In one example, the print head 308 and the thermal projector 304 may be housed in a print bar spanning one dimension of the build area 302, while the roller 330 may be housed in a carriage spanning another dimension of the build area 302. For instance, the roller 330 may apply a layer of material 324 in a pass over the build area 302, which may be followed by a pass or passes of the print head 308 and thermal projector 304 over the build area 302.

The controller 316 is a computing device, a semiconductor-based microprocessor, a Central Processing Unit (CPU), Graphics Processing Unit (GPU), Field-Programmable Gate Array (FPGA), an application-specific integrated circuit (ASIC), and/or other hardware device. The controller 316 may be connected to other components of the 3D printing device 300 via communication lines (not shown).

The controller 316 may control actuators (not shown) to control operations of the components of the 3D printing device 300. For example, the controller 316 may control an actuator or actuators that control movement of the print head 308 (along the x-, y-, and/or z-axes), actuator or actuators that control movement of the roller 330 (along the x-, y-, and/or z-axes), and/or actuator or actuators that control movement of the thermal projector 304 (along the x-, y-, and/or z-axes). The controller 316 may also control the actuator or actuators that control the amounts (e.g., proportions) of fusing agent 312 and/or detailing agent 320 to be deposited by the print head 308 from the fusing agent container 310 and/or detailing agent container 318. In some examples, the controller 316 may control an actuator or actuators that raise and lower build area 302 along the z-axis.

The controller 316 may communicate with a data store 314. The data store 314 may include machine-readable instructions that cause the controller 316 to control the supply of material 324, to control the supply of fusing agent 312 and/or detailing agent 320 to the print head 308, to control movement of the print head 308, to control movement of the roller 330, and/or to control movement of the thermal projector 304.

In some examples, the controller 316 may control the roller 330, the print head 308, and/or the thermal projector 304 to print a 3D object based on a 3D model. For instance, the controller 316 may utilize a shape map (e.g., slice) that is based on the 3D model. In some examples, the controller 316 may produce and/or utilize the shape map to control the print head 308. The shape map may be utilized to determine a set of data indicating a location or locations (e.g., areas) for printing a substance (e.g., fusing agent 312 or detailing agent 320). In some examples, a shape map may include or indicate machine instructions (e.g., voxel-level machine instructions) for printing an object. For example, the shape map may be utilized to determine coordinates and/or an amount for printing the fusing agent 312 and/or coordinates and/or an amount for printing the detailing agent 320. In some examples, a shape map may correspond to a two-dimensional (2D) layer (e.g., 2D slice, 2D cross-section, etc.) of the 3D model. For instance, a 3D model may be processed to produce a plurality of shape maps corresponding to a plurality of layers of the 3D model. In some examples, a shape map may be expressed as a 2D grid of values (e.g., pixels).

The data store 314 is a machine-readable storage medium. Machine-readable storage is any electronic, magnetic, optical, or other physical storage device that stores executable instructions and/or data. A machine-readable storage medium may be, for example, Random Access Memory (RAM), an Electrically Erasable Programmable Read-Only Memory (EEPROM), a storage drive, an optical disc, and the like. A machine-readable storage medium may be encoded with executable instructions or code for controlling the 3D printing device 300. A computer-readable medium is an example of a machine-readable storage medium that is readable by a processor or computer.

The thermal sensor 306 is a device that senses or captures thermal data. The thermal sensor 306 may be integrated into, mounted in, and/or otherwise included in a machine (e.g., printer). In some examples, the thermal sensor 306 may capture thermal images of the build area 302. For instance, the thermal sensor 306 may be an infrared thermal sensor (e.g., camera) that captures thermal images of the build area 302 (e.g., applied material in the build area 302). In some examples, the thermal sensor 306 may capture thermal images during manufacturing (e.g., printing). For example, the thermal sensor 306 may capture thermal images online and/or in real-time.

A thermal image is a set of data indicating temperature (or thermal energy) in an area. A thermal image may be captured (e.g., sensed) from a thermal sensor 306 or may be calculated (e.g., predicted). For example, the thermal sensor 306 may capture a thermal image of a layer to produce a captured thermal image.

In some examples, a captured thermal image may be a two-dimensional (2D) grid of sensed temperatures (or thermal energy). In some examples, each location in the 2D grid may correspond to a location in the build area 302 (e.g., a location (x, y) of a particular level (z) at or above the build area 302). The thermal image or images may indicate thermal variation (e.g., temperature variation) over the build area 302. In some approaches, the thermal image or images may be transformed to align with a shape map.

In some examples, the controller 316 may receive a captured thermal image of a layer from the thermal sensor 306. For example, the controller 316 may command the thermal sensor 306 to capture a thermal image and/or may receive a captured thermal image from the thermal sensor 306. In some examples, the thermal sensor 306 may capture a thermal image for each layer of an object being manufactured. Each captured thermal image may be stored as thermal image data 328 in the data store 314.

In some examples, the data store 314 may store temperature estimation instructions 326, neural network instructions 329, and/or thermal image data 328. The temperature estimation instructions 326 may include instructions to estimate a temperature for a future time. In some examples, the temperature estimation instructions 326 may include the neural network instructions 329. In some examples, the neural network instructions 329 may include data defining a neural network or neural networks. For instance, the neural network instructions 329 may define a node or nodes, a connection or connections between nodes, a network layer or network layers, and/or a neural network or neural networks. Examples of neural networks include convolutional neural networks (CNNs) (e.g., basic CNN, deconvolutional neural network, inception module, residual neural network, etc.). Different depths of a neural network or neural networks may be utilized.

In some examples, the controller 316 executes the neural network instructions 329 to apply a neural network to a portion of a thermal image to produce an adaptive thermal diffusivity kernel. For example, applying the neural network may include separately applying each of a plurality of neural network parameter sets (e.g., sub-kernels, weights) to the portion of the thermal image. For instance, the controller 316 may separately convolve a portion (e.g., patch) of a thermal image with each of the sub-kernels (e.g., trained sub-kernels). In some examples, the controller 316 may utilize an activation function and/or perform the convolution in accordance with Equation (5). The convolution may produce kernel parameters, which may be utilized to form the adaptive thermal diffusivity kernel. In some approaches, an adaptive thermal diffusivity kernel may be produced for a set of pixels (or voxels) or for each pixel (or voxel) in the thermal image or a temperature map corresponding to the thermal image.

In some examples, the controller 316 executes the temperature estimation instructions 326 to estimate a temperature for a future time based on the adaptive thermal diffusivity kernel. For example, the controller 316 may convolve the thermal image (from time t) with the adaptive thermal diffusivity kernel (e.g., a scaled adaptive thermal diffusivity kernel that is scaled by A). In some examples, the convolution result may be multiplied by an amount of time (e.g., dt) for prediction from the time of the thermal image (e.g., t) and/or divided by a squared dimension of a pixel or voxel, the result of which may be added to the thermal image (or a temperature map corresponding to the thermal image). Execution of the temperature estimation instructions 326 may produce the estimated temperature or temperature map. In some examples, the temperature estimation instructions 326 may be executed in accordance with Equation (4). For example, estimating the temperature may be performed with a convolutional layer that does not include a trainable parameter.

In some examples, the estimated temperature may correspond to a layer that is the same as a layer corresponding to the captured thermal image. For example, the captured thermal image may correspond to a first layer and the predicted thermal image may correspond to the first layer.

It should be noted that other thermal images (e.g., training thermal images) may be utilized to train the neural network or networks in some examples. For instance, the controller 316 may compute a loss function based on an estimated (e.g., predicted) thermal image and an actual thermal image corresponding to the predicted time. The neural network or networks may be trained based on the loss function.

In some examples, the controller 316 may print a layer or layers based on the estimated (e.g., predicted) temperature. For instance, the controller 316 may control the amount and/or location of fusing agent 312 and/or detailing agent 320 for a layer based on the estimated temperature. In some examples, the controller 316 may drive model setting (e.g., the size of the stride) based on the estimated temperature. Additionally or alternatively, the controller 316 may perform offline print mode tuning based on the estimated temperature. For example, if the estimated temperature indicates systematic bias (e.g., a particular portion of the build area is consistently colder or warmer than baseline), the data pipeline may be altered such that printing is (e.g., fusing agent 312 and/or detailing agent 320 amounts and/or locations are) modified to compensate for such systematic bias. For instance, if the estimated temperature indicates a systematic bias, the controller 316 may adjust printing (for a layer or layers, for example) to compensate for the bias. Accordingly, the location and/or amount of agent(s) deposited may be adjusted to improve print accuracy and/or performance.

Figure 4:
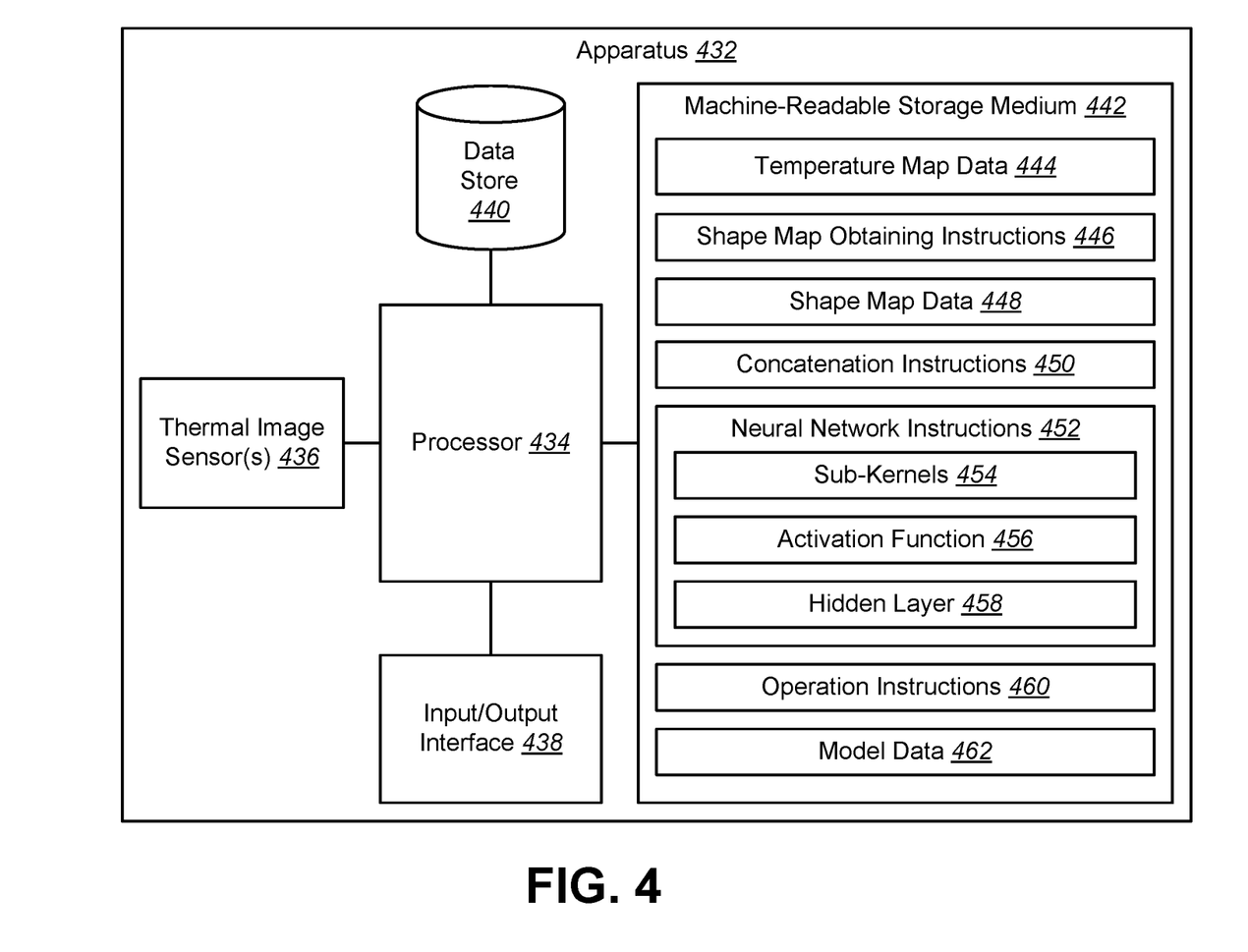
FIG. 4 is a block diagram of an example of an apparatus that may be used in determining thermal diffusivity.

FIG. 4 is a block diagram of an example of an apparatus 432 that may be used in determining thermal diffusivity. The apparatus 432 may be a computing device, such as a personal computer, a server computer, a printer, a 3D printer, a smartphone, a tablet computer, etc. The apparatus 432 may include and/or may be coupled to a processor 434, a data store 440, an input/output interface 438, a machine-readable storage medium 442, and/or a thermal image sensor or sensors 436. In some examples, the apparatus 432 may be in communication with (e.g., coupled to, have a communication link with) an additive manufacturing device (e.g., the 3D printing device 300 described in connection with FIG. 3). Alternatively, the apparatus 432 may be an example of the 3D printing device 300 described in connection with FIG. 1. For instance, the processor 434 may be an example of the controller 316 described in connection with FIG. 3, the data store 440 may be an example of the data store 314 described in connection with FIG. 3, and the thermal image sensor or sensors 436 may be an example of the thermal sensor 306 described in connection with FIG. 3. The apparatus 432 may include additional components (not shown) and/or some of the components described herein may be removed and/or modified without departing from the scope of this disclosure.

The processor 434 may be any of a central processing unit (CPU), a semiconductor-based microprocessor, graphics processing unit (GPU), FPGA, an application-specific integrated circuit (ASIC), and/or other hardware device suitable for retrieval and execution of instructions stored in the machine-readable storage medium 442. The processor 434 may fetch, decode, and/or execute instructions (e.g., operation instructions 460) stored on the machine-readable storage medium 442. Additionally or alternatively, the processor 434 may include an electronic circuit or circuits that include electronic components for performing a functionality or functionalities of the instructions (e.g., operation instructions 460). In some examples, the processor 434 may be configured to perform one, some, or all of the functions, operations, elements, methods, etc., described in connection with one, some, or all of FIGS. 1-3.

The machine-readable storage medium 442 may be any electronic, magnetic, optical, or other physical storage device that contains or stores electronic information (e.g., instructions and/or data). Thus, the machine-readable storage medium 442 may be, for example, Random Access Memory (RAM), Electrically Erasable Programmable Read-Only Memory (EEPROM), a storage device, an optical disc, and the like. In some implementations, the machine-readable storage medium 442 may be a non-transitory tangible machine-readable storage medium, where the term "non-transitory" does not encompass transitory propagating signals.

The apparatus 432 may also include a data store 440 on which the processor 434 may store information. The data store 440 may be volatile and/or non-volatile memory, such as Dynamic Random Access Memory (DRAM), EEPROM, magnetoresistive random-access memory (MRAM), phase change RAM (PCRAM), memristor, flash memory, and the like. In some examples, the machine-readable storage medium 442 may be included in the data store 440. Alternatively, the machine-readable storage medium 442 may be separate from the data store 440. In some approaches, the data store 440 may store similar instructions and/or data as that stored by the machine-readable storage medium 442. For example, the data store 440 may be non-volatile memory and the machine-readable storage medium 442 may be volatile memory.

The apparatus 432 may further include an input/output interface 438 through which the processor 434 may communicate with an external device or devices (not shown), for instance, to receive and store the information pertaining to the object or objects to be manufactured (e.g., printed). The input/output interface 438 may include hardware and/or machine-readable instructions to enable the processor 434 to communicate with the external device or devices. The input/output interface 438 may enable a wired or wireless connection to the external device or devices. The input/output interface 438 may further include a network interface card and/or may also include hardware and/or machine-readable instructions to enable the processor 434 to communicate with various input and/or output devices, such as a keyboard, a mouse, a display, another apparatus, electronic device, computing device, etc., through which a user may input instructions into the apparatus 432.

In some examples, the machine-readable storage medium 442 may store temperature map data 444. The temperature map data 444 may be obtained (e.g., received) from a thermal image sensor or sensors 436 and/or may be predicted. For example, the processor 434 may execute instructions (not shown in FIG. 4) to obtain a captured thermal image or images for a layer or layers. In some examples, the apparatus 432 may include a thermal image sensor or sensors 436, may be coupled to a remote thermal image sensor or sensors, and/or may receive temperature map data 444 (e.g., a thermal image or images) from a (integrated and/or remote) thermal image sensor. Some examples of thermal image sensors 436 include thermal cameras (e.g., infrared cameras). Other kinds of thermal sensors may be utilized.

In some examples, a thermal image sensor or sensors 436 may provide voxel-level (or near voxel-level) thermal sensing (e.g., 640×480 pixels) for neural network training. For instance, the thermal image sensor or sensors 436 may capture thermal images for training temperature maps (e.g., a voxel-level ground truth for machine learning model training). In some examples for adaptive thermal diffusivity kernel prediction, the temperature map data 444 may be collected at a rate of 10 frames per second, where printing time may be approximately 10.7 seconds per layer. The sensing rate may provide approximately 100 images per layer, which may provide thermal image segments for machine learning model training.

The temperature map data 444 may include and/or may be based on a thermal image or images. As described above, a thermal image may be an image that indicates heat (e.g., temperature) over an area and/or volume. For example, a thermal image may indicate a build area temperature distribution (e.g., thermal temperature distribution over a top layer). In some examples, the apparatus 432 may perform a corrective procedure on the thermal images to compensate for distortion introduced by the thermal image sensor or sensors 436. For example, a thermal image may be transformed to register the thermal image with the shape map or maps. Different types of thermal sensing devices may be used in different examples.

In some examples, the processor 434 may execute shape map obtaining instructions 446 to obtain shape map data 448. For example, the shape map obtaining instructions 446 may generate a shape map or maps (e.g., from 3D model data) and/or may receive a shape map or maps from another device (via the input/output interface 438, for example). The shape map data 448 may indicate the location of the object in a 2D layer for printing the 3D object. For instance, the shape map data 448 may be utilized to determine agent distribution.

The machine-readable storage medium 442 may store concatenation instructions 450. The processor 434 may execute the concatenation instructions to concatenate a shape map with a temperature map to produce an input (e.g., an input map corresponding to a layer).

The machine-readable storage medium 442 may store neural network instructions 452. The neural network instructions 452 may include data defining and/or implementing a neural network or neural networks. For instance, the neural network instructions 452 may define a node or nodes, a connection or connections between nodes, a network layer or network layers, and/or a neural network or neural networks. An example of a neural network structure that may be implemented in accordance with the techniques described herein is described in connection with FIG. 5. In some examples, the neural network instructions 452 may include and/or define sub-kernels 454, an activation function 456, and/or a hidden layer or hidden layers 458. In some examples, the sub-kernels 454 may be trained with a neural network. For example, each of the sub-kernels 454 may include a set of weights that may be trained with training temperature maps and/or training shape maps.

The processor 434 may execute the neural network instructions 452 to determine a matrix of thermal diffusivity parameters based on the input and the sub-kernels. In some examples, the processor 434 may determine the matrix of thermal diffusivity parameters in accordance with Equation (5) and the matrix K described herein. For instance, the processor 434 may convolve the input with each of the sub-kernels 454 and apply the activation function 456 to produce the kernel parameters. The processor 434 may structure the kernel parameters in accordance with the matrix K described herein.

In some examples, the processor 434 may execute the neural network instructions 452 to determine a predicted temperature map based on the matrix of thermal diffusivity parameters (e.g., an adaptive thermal diffusion kernel) and the temperature map. For instance, the processor 434 may determine the predicted temperature map in accordance with Equation (4).

In some examples, the processor 434 may execute the operation instructions 460 to perform an operation based on the thermal diffusivity parameters and/or the predicted temperature map. For example, the processor 434 may print (e.g., control amount and/or location of agent(s) for) a layer or layers based on the predicted temperature map. In some examples, the processor 434 may drive model setting (e.g., the size of the stride) based on the predicted temperature map. Additionally or alternatively, the processor 434 may perform offline print mode tuning based on the predicted temperature map. In some examples, the processor 434 may perform print monitoring based on the predicted temperature map. Additionally or alternatively, the processor 434 may send a message (e.g., alert, alarm, progress report, quality rating, etc.) based on the predicted temperature map. Additionally or alternatively, the processor 434 may halt printing in a case that the predicted temperature map indicates a problem (e.g., more than a threshold difference between a layer or layers of printing and the 3D model and/or shape map). Additionally or alternatively, the processor 434 may feed the predicted temperature map for the upcoming layer to a thermal feedback control system to online compensate the shape maps for the upcoming layer.

Examples of the techniques described herein may provide a quantitative thermal diffusivity model that considers the complicated thermal diffusivity properties including the anisotropicity, phase-dependency, and/or neighbor-dependency. Some examples provide deep learning approaches in combination with a physical model for detecting thermal problems.

Some examples can achieve voxel level thermal prediction with built-in thermal sensing and shape maps as input. Some examples may enable real-time in-situ voxel-level thermal image prediction and feedback control. For example, the neural network architecture may enable the real-time in-situ fusing layer thermal prediction and/or online closed-loop thermal feedback control. Some examples of the techniques described here may enable additive manufacturing devices to provide built-in online voxel-level print monitoring. Some examples of the techniques described herein may provide higher part accuracy, production robustness and repeatability by accurately capturing in-situ information of the thermal environment in a printer.

In some examples, the machine-readable storage medium 442 may store 3D model data 462. The 3D model data 462 may be generated by the apparatus 432 and/or received from another device. In some examples, the machine-readable storage medium 442 may include slicing instructions (not shown in FIG. 4). For example, the processor 434 may execute the slicing instructions to perform slicing on the 3D model data to produce a stack of shape maps (e.g., 2D vector slices).

In some examples, the operation instructions 460 may include 3D printing instructions. For instance, the processor 434 may execute the 3D printing instructions to print a 3D object or objects. In some implementations, the 3D printing instructions may include instructions for controlling a device or devices (e.g., rollers, print heads, and/or thermal projectors, etc.). For example, the 3D printing instructions may use a shape map or maps to control a print head or heads to print in a location or locations specified by the shape map or maps. In some examples, the processor 434 may execute the 3D printing instructions to print a layer or layers. The printing (e.g., thermal projector control) may be based on temperature maps (e.g., from captured thermal images and/or predicted temperature maps).

In some examples, the machine-readable storage medium 442 may store neural network training instructions. The processor 434 may execute the neural network training instructions to train a neural network or neural networks (defined by the neural network instructions 452, for instance). In some examples, the processor 434 may train the neural network or networks using a set of training temperature maps and/or training shape maps. The thermal sensor(s) 436 may be utilized to obtain the training temperature maps. In some examples, the thermal sensor(s) 436 may be placed outside of an additive manufacturing device (e.g., printer). In some approaches, the neural network training instructions may include a loss function. The processor 434 may compute the loss function based on a predicted temperature map and a training temperature map. For example, the training temperature map may provide the ground truth for the loss function. The loss function may be utilized to train a neural network or neural networks. For example, a node or nodes and/or a connection weight or weights in the neural network or networks may be adjusted based on the loss function in order to improve the prediction accuracy of the neural network or networks. It should be noted that not all of the functions and/or features described in connection with FIG. 4 may be implemented or utilized in all examples.

Figure 5:
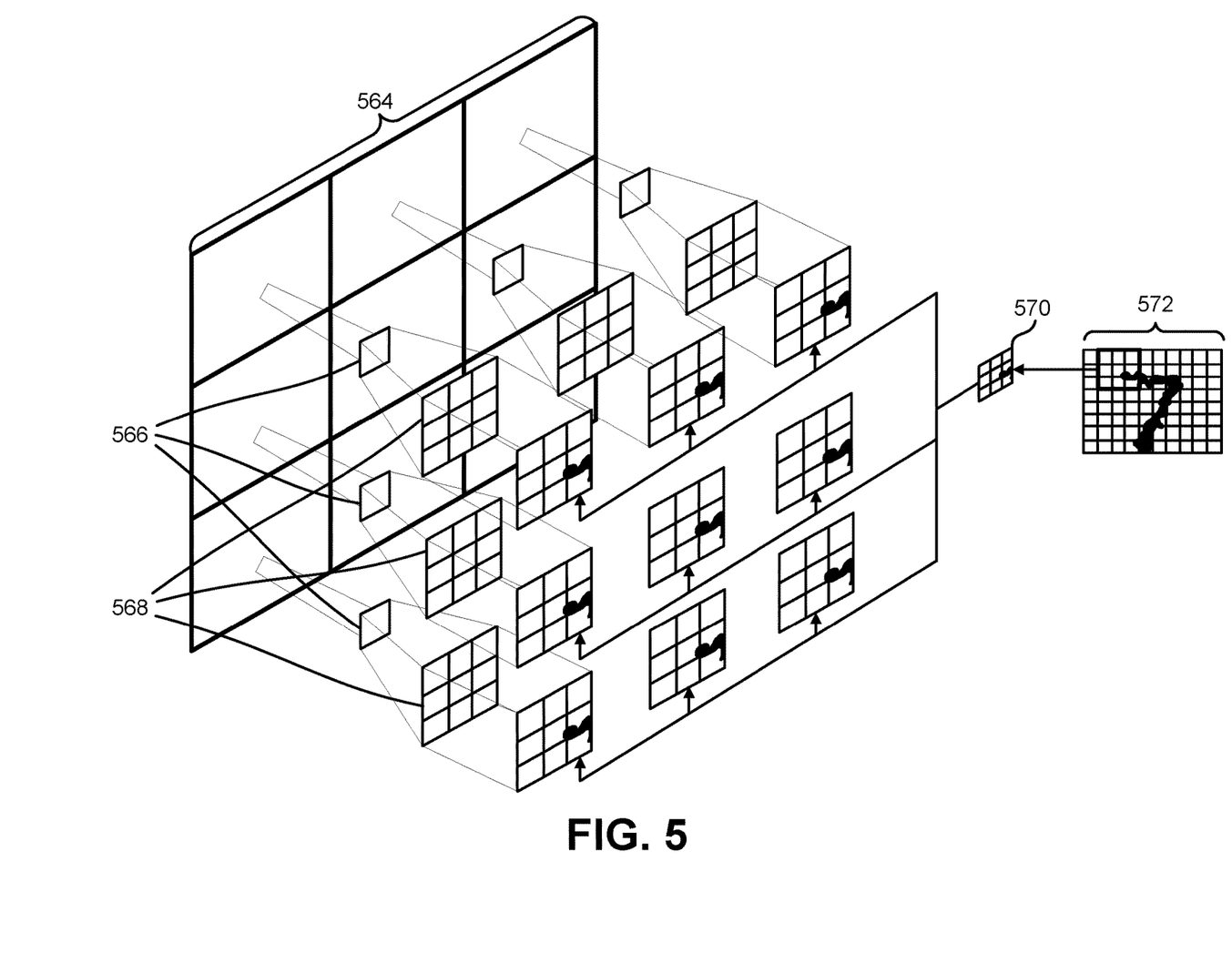
FIG. 5 is a diagram illustrating an example of a neural network structure that may be implemented in accordance with some examples of the techniques disclosed herein.

FIG. 5 is a diagram illustrating an example of a neural network structure that may be implemented in accordance with some examples of the techniques disclosed herein. For instance, the neural network structure may be utilized in accordance with some examples of the methods 100, 200, 3D printing device 300, and/or apparatus 432 described herein. FIG. 5 illustrates an input map 572. For example, the input map 572 may represent a concatenation of a temperature map and a shape map. A portion 570 (e.g., a window or sliding window) of the input map 572 may be extracted as an input. In this example, the portion 570 is a 3×3 set of pixels and may be denoted X (with $X_{i,j}$ representing a pixel of the input). The portion 570 may be convolved separately with each of a set of sub-kernels 568.

In this example, nine sub-kernels 568 may be utilized, though five sub-kernels 568 are illustrated for convenience. Each sub-kernel 568 may be denoted $Q_{u,v}$. In this example, each sub-kernel 568 is a 3×3 sub-kernel including nine weights (which may be denoted $w_{0,0}$, $w_{0,1}$, $w_{0,2}$, $w_{1,0}$, $w_{1,1}$, $w_{2,0}$, $w_{2,1}$, and $w_{2,2}$ for example).

The convolutions (e.g., $\sigma_{0,0} = \Sigma w_{i,j} X_{i,j}$) of the sub-kernels 568 with the portion 570 may produce kernel parameters 566. The kernel parameters 566 may be denoted $k_{0,0}$, $k_{0,1}$, $k_{0,2}$, $k_{1,0}$, $k_{1,1}$, $k_{1,2}$, $k_{2,0}$, $k_{2,1}$, and $k_{2,2}$. The kernel parameters 566 may be components of the adaptive thermal diffusivity kernel 564 (e.g., $k_{0,0} = \mathrm{ReLu}(\sigma_{0,0})$).

In some examples, it may be observed that the adaptive thermal diffusivity kernels are different for each voxel. The kernel parameters may be different, which may indicate an anisotropic property. The kernel parameters may be small and close to zero in the center of a solid part, which is consistent with energy absorption dominating the thermal behavior in the part center, where thermal conduction may be rare. The kernel parameters may be larger but still relatively small in the powder area due to conduction. The diffusivity in a boundary area may be much larger, which may indicate that thermal diffusion mostly occurs along the boundary.

Some examples of the techniques described herein may be helpful in metal printing, where the thermal diffusivity may be very different between different phases. Some examples may adaptively predict the local adaptive thermal diffusivity kernel according to the actual local environment, which may provide better knowledge for different use cases.

It should be noted that while various examples of systems and methods are described herein, the disclosure should not be limited to the examples. Variations of the examples described herein may be implemented within the scope of the disclosure. For example, operations, functions, aspects, or elements of the examples described herein may be omitted or combined.

The invention claimed is:

1. A method, comprising:
    capturing a thermal image via a thermal sensor corresponding to a three-dimensional (3D) printing device;
    generating a temperature map by applying a transformation to the thermal image;
    generating a concatenated map by concatenating at least one pixel in the temperature map with at least one pixel in a shape map that indicates locations for printing a layer;
    determining a kernel parameter based on convolving a sub-kernel with the concatenated map;
    generating an adaptive thermal diffusivity kernel based on the kernel parameter;
    predicting a temperature based on the adaptive thermal diffusivity kernel; and
    printing a subsequent layer using the 3D printing device based on the predicted temperature.

2. The method of claim 1, further comprising:
    utilizing a machine learning model having multiple layers to determine neighboring kernel parameters of the adaptive thermal diffusivity kernel by convolving the concatenated map with neighboring sub-kernels; and
    predicting the temperature based on the neighboring kernel parameters.

3. The method of claim 2, wherein the adaptive thermal diffusivity kernel is generated based on convolutions of a plurality of sub-kernels and the temperature map, and wherein the voxel parameter and the neighboring kernel voxel parameters include thermal diffusion values.

4. The method of claim 2, wherein the adaptive thermal diffusivity kernel is generated based on an activation function to ensure that the kernel parameter is greater than zero.

5. The method of claim 2, wherein the machine learning model is trained based on a training temperature map and a training shape map, and wherein the machine learning model comprises a plurality of sub-kernels of the adaptive thermal diffusivity kernel.

6. The method of claim 5, wherein the machine learning model is constrained with a physical heat transfer model.

7. The method of claim 1, further comprising determining a plurality of kernel parameters, each having neighboring sub-kernels, based on convolving the neighboring sub-kernels with the concatenated map, and using the plurality of kernel parameters to generate the adaptive thermal diffusivity kernel for predicting the temperature.

8. The method of claim 1, wherein predicting the temperature is based on the adaptive thermal diffusivity kernel with neighbor-dependent parameters.

9. The method of claim 1, wherein the adaptive thermal diffusivity kernel is generated using a plurality of thermal sensors that collect z-direction thermal sensing data, and wherein the temperature is predicted based on the z-direction thermal sensing data.

10. The method of claim 1, the kernel parameter being determined based on separately convolving a plurality of sub-kernels, including the sub-kernel, with the concatenated map.

11. A system, comprising a controller of a three-dimensional (3D) printing device that:

captures a thermal image via a thermal sensor;
generates a temperature map by applying a transformation to the thermal image;
generates a concatenated map by concatenating at least one pixel of the temperature map with at least one pixel of a shape map that indicates locations for printing a layer;
convolves sub-kernels with the concatenated map to generate an adaptive thermal diffusivity kernel;
predicts a temperature based on the adaptive thermal diffusivity kernel; and
prints a subsequent layer using the 3D printing device based on the predicted temperature.

12. The system of claim 11, wherein the controller further controls an amount and location of fusing agent for printing the subsequent layer based on the temperature predicted.

13. The system of claim 11, wherein the controller further performs an offline print mode tuning to the 3D printing device based on the temperature predicted and prior to printing the subsequent layer.

14. The system of claim 11, wherein applying the neural network to the temperature map includes applying a set of sub-kernels are separately convolved a portion of the thermal image with each of the set of sub-kernels.

15. The system of claim 11, wherein the controller further captures a plurality of thermal images from the thermal sensor that provides voxel-level thermal sensing and uses the plurality of thermal images to generate the temperature map.

16. One or more non-transitory computer storage media storing computer-useable instructions that, when used by a user device, cause the user device to perform operations, the operations comprising:
receiving a thermal image captured via a thermal sensor that is communicatively coupled with a three-dimensional (3D) printing device;
generating a temperature map by applying a transformation to the thermal image;
generating a concatenated map by concatenating at least one pixel of the temperature map with at least one pixel of a shape map that indicates locations for printing a layer;
convolving a sub-kernel with the concatenated map to produce an adaptive thermal diffusivity kernel;
predicting a temperature based on the adaptive thermal diffusivity kernel; and
causing a subsequent layer to be printed using the 3D printing device based on the predicted temperature.

17. The one or more non-transitory computer storage media of claim 16, wherein the shape map indicates an amount for printing a fusing agent and an amount for printing a detailing agent using the 3D printing device, and wherein the amount of the fusing agent and the amount of detailing agent are applied while printing the subsequent layer.

18. The one or more non-transitory computer storage media of claim 17, wherein the temperature map and the shape map are concatenated using the at least one pixel with neighboring pixels of the temperature map and the at least one pixel with neighboring pixels of the shape map.

19. The one or more non-transitory computer storage media of claim 16, wherein the temperature is predicted using a convolutional layer of a machine learning model without a trainable parameter, and wherein the machine learning model is constrained by a deterministic physical model.

20. The one or more non-transitory computer storage media of claim 16, further comprising determining that the temperature predicted is above a threshold difference between a layer of printing and the shape map, and halting printing by the 3D printing device based on determining that the temperature predicted is above the threshold.

* * * * *